INVENTOR.
GEORGE T. TOMINAC
ATTORNEYS

Patented July 6, 1954

2,682,821

UNITED STATES PATENT OFFICE 2,682,821

ATTACHMENT FOR PLOWS

George T. Tominac, Dearborn, Mich., assignor to Harry Ferguson, Inc., Detroit, Mich., a corporation of Delaware Application April 21, 1950, Serial No. 157,368

2 Claims. (Cl. 97—100)

This application is a continuation-in-part of my earlier application Serial No. 74,187 filed in the United States Patent Office on February 2, 1949, now abandoned.

The present invention relates to an attachment for a plow adapted for use with a tractor of the type disclosed in Henry George Ferguson Patent No. 2,118,180, issued May 24, 1938. The plow connects to such a tractor by means of vertically spaced hitch links trailingly pivoted on the rear end portion of the latter. These links act between the plow, the tractor, and a power unit on the tractor to adjust the depth of the plow in accordance with variations in ground pull upon the same in order to maintain on the tractor a draft load of predetermined value. To provide vertically spaced connection points for such links, the plow is constructed with certain upstanding rigid members which may be characterized as a superstructure.

Generally speaking, a tractor of the type referred to above is capable of pulling a two-bottom plow in any soil. In some soils, for example, a sandy one, the tractor will have sufficient excess power to be capable of pulling a three-bottom plow, and it is desirable to use such a plow wherever possible in order to save time. From the standpoint of cost of equipment it is desirable to have a two-bottom plow and an attachment for converting the same to a three-bottom plow, rather than separate two-bottom and three-bottom plows.

An object of the present invention is to provide an attachment for optionally increasing the number of plow bottoms or base elements of a plow and which may, for example, convert a two-bottom plow into a three-bottom plow.

A further object is to provide a plow conversion attachment of the character set forth and which will take advantage of the superstructure on the plow to achieve adequate balance and rigidity.

Other objects and advantages will appear from the disclosure herein, taken in the light of the accompanying drawings wherein.

Figure 1:
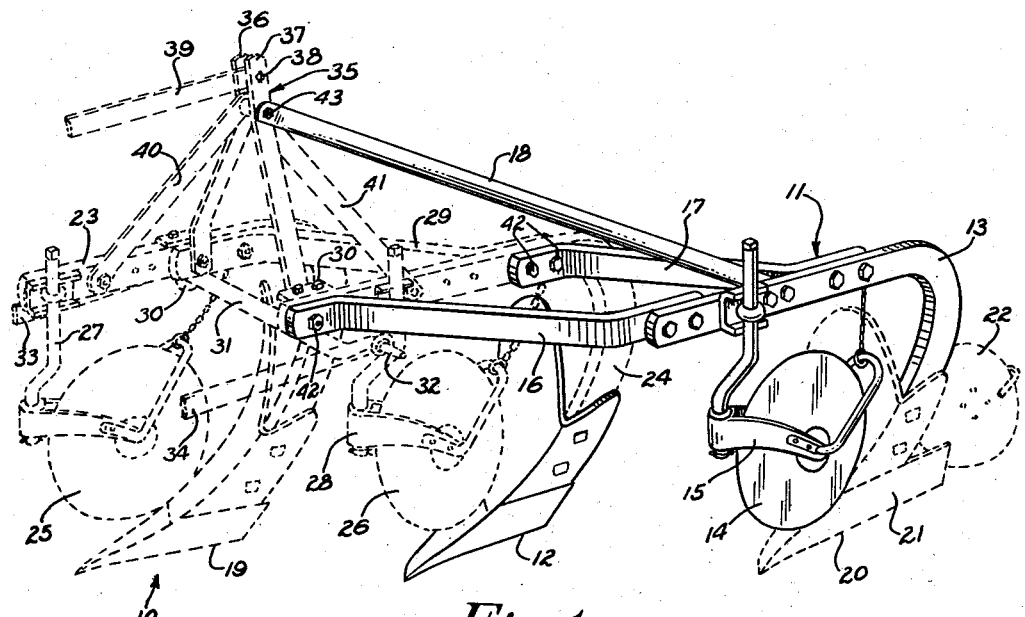
Figure 1 is a perspective view of a plow with an illustrative conversion attachment embodying the present invention installed thereon, the components of the attachment being shown in solid outline.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawing, there is shown a two-bottom plow 10 of the character set forth above and having installed thereon an illustrative conversion attachment 11 embodying the present invention. To facilitate description, the components of the plow 10 and a portion of the hitch for connecting the same to the tractor are designated in broken outline, while the components of the attachment 11 are indicated in solid outline. In the present instance, the attachment 11 comprises a supplemental plow base 12, a supplemental plow beam 13, a coulter 14 journaled on a supporting bracket 15 depending from the beam 13, and a pair of longitudinally spaced transverse braces 16, 17. In addition to the foregoing elements, and of cardinal importance, the attachment 11 also includes a relatively long forwardly inclined strut 18.

Turning now to the plow 10, it will be perceived that the latter includes in its organization a leading plow base 19 and a trailing plow base 20. For two-bottom operation, the base 20 is normally located in the position occupied by the supplemental base 12 in Fig. 1. The share and mold board of the base 20 are similar to those of the base 19. The base 20 differs from the latter, however, in that it is provided with a substantially longer landside 21 together with a rearwardly extending furrow wheel 22. These parts adapt the base 20 to serve in trailing position on the implement. The plow 10 is provided with plow beams 23 and 24, both having rearward portions depending from the implement in a well-known manner to carry respective ones of the plow bases for two-bottom operation. The plow 10 also includes a pair of coulters 25, 26 adjustably supported in depending relation from the forward end portions of the plow beams as by means of brackets 27, 28, respectively. Bolted or otherwise rigidly secured to the beams 23, 24 is a diagonal brace 29 which serves as one of the major frame elements of the implement. Spanning the beams 23, 24 and rigidly but adjustably fixed to the same as by means of U-bolts 30 is a supporting cross shaft 31 which also acts as a major frame element of the implement.

To adapt the plow 10 for use with a tractor having the automatic draft control feature referred to earlier herein, the cross shaft 31 is formed with end portions 32 of reduced diameter which define laterally spaced hitch points for engaging lower hitch links 33, 34 trailingly pivoted on the rear end portion of the tractor below and slightly forward of the rear axle. In furtherance of the same objective, the plow 10 is fashioned with a superstructure 35 which defines another hitch point spaced above and centrally of the other hitch point. The superstructure 35 comprises a pair of upwardly converging arms 36, 37 fixed at their lower ends to the plow beams 23, 24 and carrying at their upper ends a suitable pivot member 38. This member permits the upper end of the superstructure 35 to be connected with an upper or compression link 39 spaced above the links 33, 34 and trailingly pivoted from a control element mounted near the top of the rear end portion of the tractor. The superstructure 35 is reinforced in position on the implement frame by means of fore and aft braces 40, 41 connecting the plow beams 23, 24 with a point slightly below the pivot 38.

At this point it might be noted that the end portions 32 of the cross shaft 31 are offset from the axis of the same. By locking the shaft 31 in different angular positions, it is possible to change the angle between the plow and the line of draft of the tractor and hence to vary, within limits, the width of cut of the plow.

Prior to installation of the attachment 11, and when the plow 10 is hitched to the tractor by the lower or tension links 33, 34 and the upper or compression link 39, the plow operates on the tractor draft control system to maintain the draft load on the tractor at a predetermined or preselected value in the manner disclosed in Ferguson Patent No. 2,118,180, supra. Thus when in lowered or plowing position, variations in draft load on the tractor due to increasing or decreasing ground pull on the plow bases 19, 20 result in bodily rocking of the implement and its superstructure 35 in a fore and aft plane. Since the superstructure 35 is rigidly fixed to the plow, such action produces corresponding variations in the compression force on the upper link 39 which are impressed upon an appropriate control in the hydraulic system of the tractor so as to produce a corrective vertical movement of the lower links 33, 34 and the plow 10. Such corrective movement is, of course, in the proper direction to restore the draft load on the tractor to its predetermined or preselected value.

Turning now to the relation between the conversion attachment 11 and the plow 10, it will be perceived upon reference to Figure 1 that the attachment can readily be fastened to the plow by rigidly connecting the transverse braces 16, 17 to the plow beam 24 as by means of bolts 42. This locks supplemental plow beam 13 in laterally and rearwardly spaced relation to the plow beams 23, 24 of the plow 10. By the same token, supplemental plow base 12, which is similar to the leading base 19 of the implement, may be connected to the depending end of the plow beam 24 in place of the trailing base 20. The latter, along with its furrow wheel 22, may simply be transferred from the beam 24 and secured to the depending end of the supplemental plow beam 13.

The construction thus far described would, to all intents and purposes, appear to be adequate for converting the plow 10 from a two-bottom to a three-bottom unit. Not only are the plow bases 19, 12 and 20 located in properly spaced relation to plow three substantially identical furrows side by side, but the trailing base 20 and beam 13 are connected to the other portion of the implement by the relatively massive braces 16, 17. Upon reflection, however, it will be appreciated that such construction, standing by itself, would unbalance the equilibrium of the plow 10 to such an extent that satisfactory operation of the implement in automatic draft control would be virtually precluded.

Figure 2:
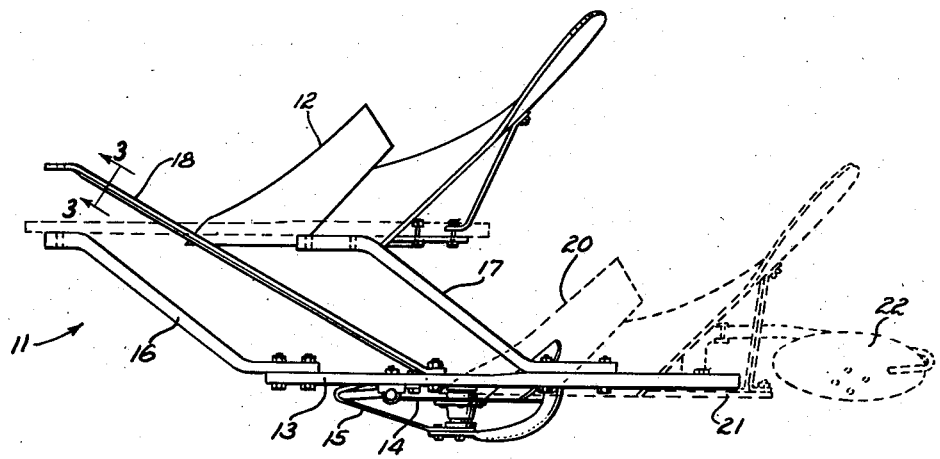
Fig. 2 is a plan view of the attachment shown in Fig. 1, certain of the parts of the plow being indicated in broken outline.
Figure 3:
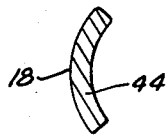
Fig. 3 is a transverse sectional view through a member of the attachment, such view being taken in the plane of the line 3—3 in Fig. 2.

Provision is made for effecting satisfactory operation of the plow 10 in conjunction with the automatic draft control system of the tractor after installation of the conversion attachment 11 without disturbing the connection between the plow 10 and the tractor hitch links 33, 34, 39. This is accomplished in a remarkably simple yet unobvious manner by making advantageous use of the rigid superstructure 35 of the plow. Accordingly, the strut 18 is adapted for insertion between the supplemental plow beam 13 and the upper end portion of the plow superstructure 35. Preferably, the strut 18 is susceptible of attachment to the superstructure at a point slightly below the pivot 38, being secured as by means of a bolt 43 which also secures the upper ends of the superstructure struts 40, 41. When thus mounted, the strut 18 extends in an inclined and substantially forward direction from the general plane of the plow beams and cross shaft 31, the forward end of the strut 18 being spaced vertically from such plane by an amount almost equal to the height of the superstructure. When the implement is in lowered or plowing position, the ground reaction on the trailing plow base 20, which would otherwise result in undesirable torsional stresses in the implement frame members along with considerable lateral unbalance, sets up a forward compression force in the strut 18. The latter effectively transmits such force to the upper hitch link 39 via the upper end portion of the superstructure and the hitch point 38. Thus the strut 18 relates the conversion attachment 11 directly to the superstructure of the plow 10, making the attachment behave as an integral part of the implement. To increase the strength of the strut 18 as a compression member, the same is fashioned with a cross section adapted to resist bending and in the present instance has an arcuate cross section 44 as indicated in Figs. 2 and 3.

In view of the foregoing, it will be appreciated that applicant's conversion attachment 11 can be installed upon or removed from the plow 10 without necessitating readjustment or modification of the draft linkage connecting the plow to the tractor. Moreover, by the simple expedient of interposing the compression strut 18 between the superstructure 35 and the trailing plow beam, the deflections and unbalanced stresses which would otherwise preclude effective automatic draft control of the plow 10 with three bottoms are neatly eliminated. After conversion to a three-bottom implement by installation of the attachment 11, the plow is enabled to cooperate with the tractor hitch linkage for the maintenance of a predetermined draft load just as effectively as in two-bottom operation.

While a particular mode of connecting the conversion attachment 11 has been described above, it should be noted that conversion may be accomplished in yet another manner. In this instance, the supplemental plow base 12 may be bolted directly to the supplemental plow beam 13, and the forward ends of the transverse braces 16, 17 may be attached to the left-hand side of the beam 13. The strut 18 may also be completely disconnected from the supplemental plow beam 13. The plow 10 may be converted from a two-bottom to a three-bottom unit simply by unbolting the plow beam 24 from the main portion of the plow, leaving the trailing base 20 and furrow wheel 22 attached thereto, and then shifting these parts laterally and rearwardly. The supplemental plow beam 13 and base 12, together with the transverse braces 16, 17 may thereupon be interposed between the main portion of the plow and the removed plow beam and trailing base. After the proper bolts have been secured, the strut 18 may then be mounted between the plow beam 24 (which is now in trailing position) and the superstructure of the plow in the manner already described.

I claim as my invention:

1. An assembly for use with a tractor having upper and lower hitch links and a draft control mechanism operatively associated with the hitch links, said assembly comprising first, second, and third plow elements, beams therefor extending in spaced parallel longitudinally displaced relation to one another so as to position the plows in spaced relation to one another generally along a line crossing the beams obliquely, a single frame member connecting the beams for the first and second plow elements, a superstructure attached to the beams for said first and second plow elements and positioned therebetween for connection to the upper link of the tractor hitch, with the beams for said first and second plow elements also being connectible to the lower links of the tractor hitch, a pair of spaced parallel frame members connecting the beams for the second and third plow elements, and an extended inclined strut connnected at its upper forward end with the superstructure and connected to the beam for the third plow element between the pair of frame members, said strut being operative to transmit compressive force from the beam for the third plow element to the upper hitch link for operation of the draft control mechanism of the tractor.

2. An attachment for a plow assembly having spaced upper and lower connecting means adapted for attachment to a tractor having a draft control mechanism and triangularly arranged upper and lower hitch links trailing from the rear of the tractor and operatively associated with the draft control mechanism, said attachment comprising the combination of a plow beam for supporting a plow bottom, cross braces for connection in longitudinally spaced relation to said plow beam and arranged for connection in similar relation to the adjoining beam of the plow assembly, and a rigid strut having one end connected with said plow beam, said strut being disposed in upward and forward and inward slanting relation with respect to said plow assembly, said strut being adapted for connection with the upper connecting means of the plow assembly and operative when so connected to transmit compressive forces from said plow beam to said upper hitch link for operation of the depth control mechanism of the tractor.

References Cited in the file of this patent

UNITED STATES PATENTS

| Number | Name | Date |
|---|---|---|
| 1,149,900 | Dewey | Aug. 10, 1915 |
| 1,394,524 | Altgelt | Oct. 25, 1921 |
| 1,412,918 | Cameron | Apr. 18, 1922 |

OTHER REFERENCES

Plow Book (copyright 1941) (Ferguson-Sherman Mfg. Corp.).